US011299106B2

(12) United States Patent
Navarro et al.

(10) Patent No.: US 11,299,106 B2
(45) Date of Patent: Apr. 12, 2022

(54) MOUNTING SYSTEM FOR A MOBILE MICROPHONE (71) Applicant: Pro-gard Products, LLC, Noblesville, IN (US)

(72) Inventors: Mike Navarro, Noblesville, IN (US); Adam Timmins, Noblesville, IN (US); Andrew Gunselman, Indianapolis, IN (US)

(73) Assignee: Pro-gard Products, LLC, Noblesville, IN (US)

( * ) Notice: Subject to any disclaimer, the term of this patent is extended or adjusted under 35 U.S.C. 154(b) by 112 days.

(21) Appl. No.: 16/905,158

(22) Filed: Jun. 18, 2020

(65) Prior Publication Data
US 2020/0398766 A1 Dec. 24, 2020

Related U.S. Application Data (60) Provisional application No. 62/894,201, filed on Jun. 20, 2019.

(51) Int. Cl.
*B60R 11/02* (2006.01)
*H04R 1/02* (2006.01)
*H04R 1/08* (2006.01)
*B60R 11/00* (2006.01)

(52) U.S. Cl.
CPC ............ *B60R 11/0247* (2013.01); *H04R 1/08* (2013.01); *B60R 2011/0005* (2013.01); *H04R 2499/13* (2013.01)

(58) Field of Classification Search
CPC . H04R 1/00; H04R 1/02; H04R 1/028; H04R 1/08; H04R 2201/021; H04R 2400/13; B60R 11/02; B60R 11/0247; B60R 2011/0005
See application file for complete search history.

(56) References Cited

U.S. PATENT DOCUMENTS

| 3,244,981 | A | 4/1966 | Tatevasian |
| 3,325,604 | A | 6/1967 | Haus |
| 4,058,357 | A | 11/1977 | Wallace |
| 4,319,097 | A | 3/1982 | Liautaud |
| 5,025,966 | A | 6/1991 | Potter |
| 5,039,047 | A | 8/1991 | Pitzo |
| 5,213,240 | A | 5/1993 | Dietz et al. |
| 5,221,929 | A | 6/1993 | Ott |

(Continued)

FOREIGN PATENT DOCUMENTS

| DE | 3322036 | 1/1985 |
| KR | 200202199 | 11/2000 |

(Continued)

OTHER PUBLICATIONS

Magnetic Conversions, LLC, Magnetic MIC, retrieved from http://magneticconversions.com/Magnetic_Mic.html, Feb. 8, 2011, 1 page.

(Continued)

*Primary Examiner* — Thang V Tran
(74) *Attorney, Agent, or Firm* — Faegre Drinker Biddle & Reath LLP (57) ABSTRACT

A mounting assembly for a radio handset microphone including an adapter configured to couple to a mechanical hang-up clip. The adapter includes a housing configured to receive a magnet.

16 Claims, 8 Drawing Sheets

(56) References Cited

U.S. PATENT DOCUMENTS

| | | | |
|---|---|---|---|
| 5,605,145 | A | 2/1997 | Hannah et al. |
| 5,992,807 | A | 11/1999 | Tarulli |
| 6,135,408 | A | 10/2000 | Richter |
| 6,149,116 | A | 11/2000 | Won |
| 6,288,684 | B1 | 9/2001 | Winggenhorn et al. |
| 6,305,656 | B1 | 10/2001 | Wemyss |
| 6,502,727 | B1 | 1/2003 | Decoteau |
| 6,888,940 | B1 | 5/2005 | Deppen |
| 7,013,492 | B2 | 3/2006 | Hugh et al. |
| 7,248,901 | B2 | 7/2007 | Peiker |
| 7,287,738 | B2 | 10/2007 | Pitlor |
| 7,374,142 | B2 | 5/2008 | Carnevali |
| 7,744,051 | B2 | 6/2010 | Joyce et al. |
| D663,115 | S | 7/2012 | Hansen |
| 8,360,378 | B1 | 1/2013 | Owens |
| 8,602,376 | B2 | 12/2013 | Vogel et al. |
| 8,708,151 | B2 | 4/2014 | Whitten et al. |
| 8,794,682 | B2 | 8/2014 | Fiedler |
| 8,823,477 | B2 | 9/2014 | Malanczyj et al. |
| 8,936,222 | B1 | 1/2015 | Bastian et al. |
| 8,950,727 | B2 | 2/2015 | Skudelny |
| 9,369,790 | B2 | 6/2016 | Schreiber et al. |
| 9,397,719 | B1 | 7/2016 | Schmidt |
| 9,794,667 | B2 | 10/2017 | Schreiber et al. |
| 9,986,322 | B2 | 5/2018 | Schreiber et al. |
| 2004/0132509 | A1 | 7/2004 | Glezerman |
| 2004/0232291 | A1 | 11/2004 | Carnevali |
| 2005/0144760 | A1 | 7/2005 | Verbaas et al. |
| 2006/0086873 | A1 | 4/2006 | Chen |
| 2007/0093279 | A1 | 4/2007 | Janik |
| 2007/0099469 | A1 | 5/2007 | Sorensen |
| 2007/0172079 | A1 | 7/2007 | Christoph |
| 2008/0164267 | A1 | 7/2008 | Huber |
| 2008/0311966 | A1 | 12/2008 | Klein |
| 2009/0116678 | A1 | 5/2009 | Bevirt et al. |
| 2010/0019110 | A1 | 1/2010 | Shepley |
| 2010/0040251 | A1 | 2/2010 | Schreiber |
| 2010/0317418 | A1 | 12/2010 | Zanetti |
| 2010/0327031 | A1 | 12/2010 | Olmos |
| 2011/0024470 | A1 | 2/2011 | Hajarian |
| 2011/0064401 | A1 | 3/2011 | Desorbo |
| 2016/0003270 | A1* | 1/2016 | Franklin ............... H01F 7/0221 439/529 |
| 2016/0286294 | A1 | 9/2016 | Schreiber et al. |
| 2017/0318697 | A1* | 11/2017 | Lebovitz ............... F16B 11/006 |
| 2018/0249236 | A1 | 8/2018 | Schreiber et al. |

FOREIGN PATENT DOCUMENTS

| | | |
|---|---|---|
| KR | 20010012021 | 2/2001 |
| KR | 20020069858 | 9/2002 |
| KR | 20040036075 | 4/2004 |
| WO | WO1999049584 | 9/1999 |
| WO | WO2000002362 | 1/2000 |

OTHER PUBLICATIONS

RAM® Tough-Box™ Console Magnetic Microphone Clip retrieved from https://www.rammount.com/part/RAM-VC-MC1M on Feb. 8, 2019, 3 pages.

Turner Microphones, Magnetic Microphone Holder, photo of product available for sale at least as early as Apr. 15, 2018, 1 page.

Turner Microphones catalogue, circa 1962, 16 pages.

* cited by examiner

MOUNTING SYSTEM FOR A MOBILE MICROPHONE

CROSS-REFERENCE TO RELATED APPLICATION

The present application claims priority to U.S. Provisional Patent Application Ser. No. 62/864,201, filed Jun. 20, 2019, the disclosure of which is expressly incorporated by reference herein.

BACKGROUND AND SUMMARY OF THE DISCLOSURE

The present invention relates generally to accessory mounts for use within a vehicle and, more particularly, to a mounting system for coupling a mobile radio microphone to an interior surface of a vehicle.

Mobile radio microphones traditionally include a mechanical clip assembly for mounting to a support, such as an interior surface within a vehicle. The clip assembly typically includes a tongue supported by a post, wherein the tongue and the post are slidably received within a groove and slot of a holder to provide a mechanical coupling therebetween. Such conventional mounting systems often require precise positioning of the microphone relative to the holder for coupling thereto, a task that may prove difficult in a moving vehicle.

As such, alternative mounting systems have been developed for microphones including, for example, magnetic adapters coupling the microphone to a metal surface within the vehicle. While magnetic adapters for coupling to mechanical clip assemblies of mobile radio microphones are well-known in the art, there remains a need for an assembly that securely captures the clip assembly of a conventional microphone.

According to an illustrative embodiment of the present disclosure, a mounting assembly for a radio handset microphone includes a base formed of a magnetically attractive material, a fastener configured to secure the base to an interior surface of the vehicle, and an adapter configured to couple to a mechanical hang-up clip having a post and a tongue supported by the post. The adapter includes a first housing member, a second housing member cooperating with the first housing member, and a coupler securing the together the first housing member and the second housing member. A proximal chamber is defined by the first housing member and the second housing member, the proximal chamber configured to receive the tongue of the mechanical hang-up clip. A proximal opening is defined by the first housing member and the second housing member and is in communication with the proximal chamber. The proximal opening is configured to receive the post of the mechanical hang-up clip. A distal chamber is defined by the first housing member and the second housing member. A distal opening is defined by the first housing member and the second housing member and is in communication with the distal chamber. A magnet is received within the distal chamber.

According to another illustrative embodiment of the present disclosure, an adapter is configured to couple to a mechanical hang-up clip having a post and a tongue supported by the post. The adapter includes a disc shaped housing defined by a first housing member and a second housing member cooperating with the first housing member. A coupler secures together the first housing member and the second housing member. A proximal chamber is defined by the disc shaped housing, and is configured to receive the tongue of the mechanical hang-up clip. A proximal opening is in communication the proximal chamber, and is configured to receive the post of the mechanical hang-up clip. A distal chamber is defined by the disc shaped housing, and a distal opening is in communication with the distal chamber. A magnet is received within the distal chamber. The proximal chamber is defined between the magnet and an upper wall of the disc shaped housing, and the proximal opening is formed within the upper wall.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to the precise form disclosed. Rather, the embodiments selected for description have been chosen to enable one skilled in the art to practice the invention.

Referring initially to FIGS. 1-3B, an illustrative mounting assembly 10 is shown for coupling with a conventional radio handset microphone 12 of the type typically used in emergency vehicles, such as police cars. The radio handset microphone 12 illustratively includes a body 14 receiving internal electrical components, such as a microphone and a speaker (not shown), and supporting an external mechanical hang-up clip 16. The hang-up clip 16 may be of conventional design as including a cylindrical post 18 supporting a disk-shaped tongue 20 integrally formed of a metal, such as aluminum.

Figure 1:
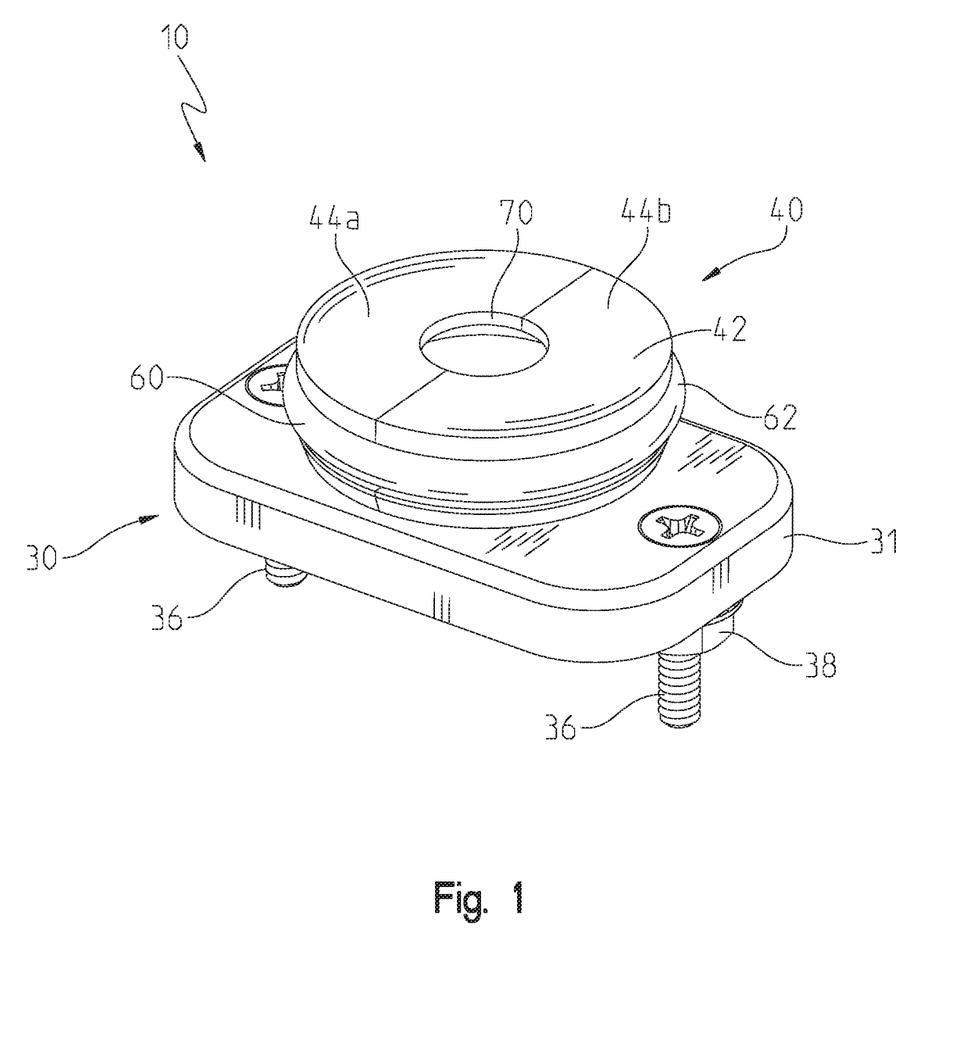
FIG. 1 is a perspective view of an illustrative mounting assembly of the present disclosure.
Figure 2A:
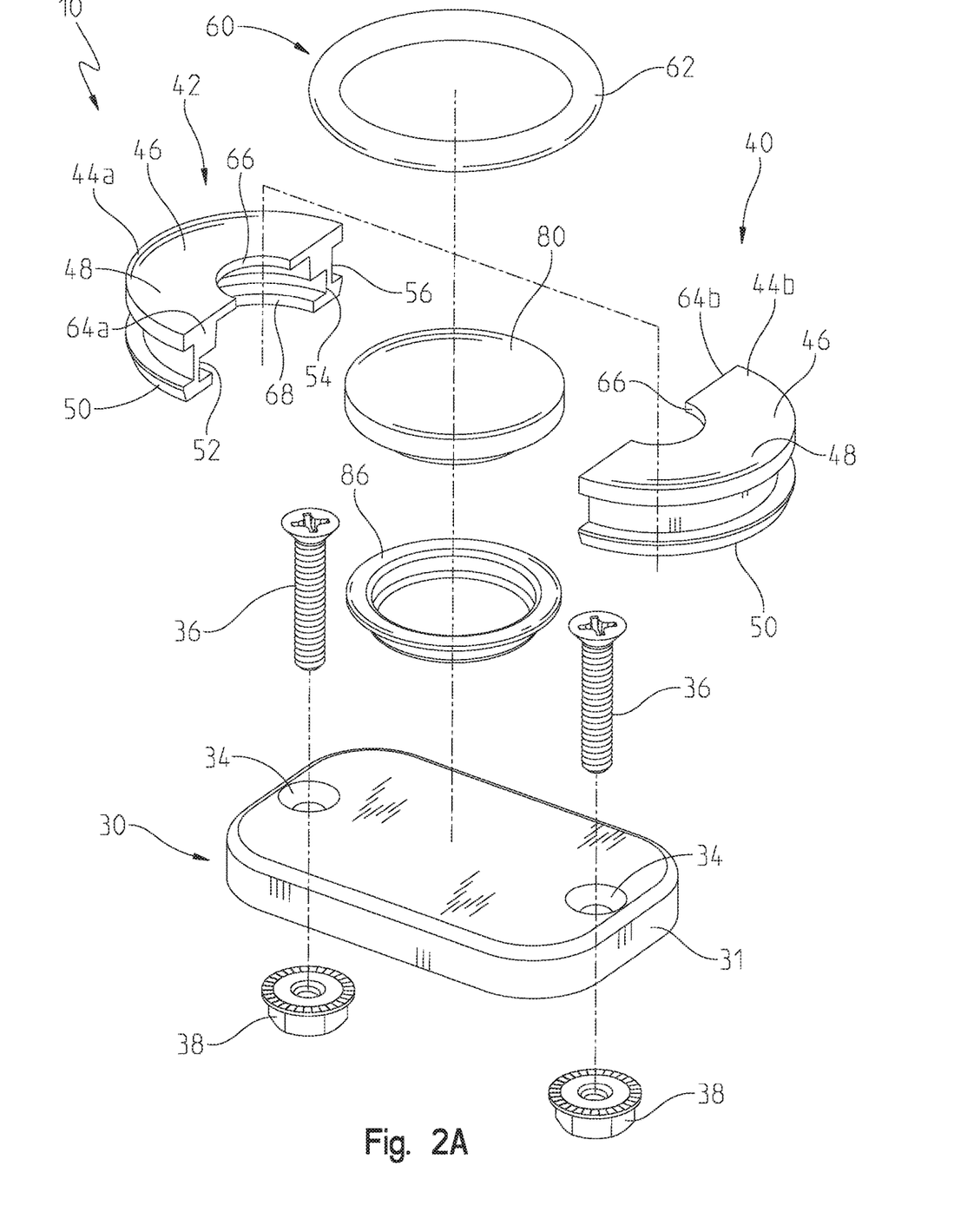
FIG. 2A is an exploded perspective view of the mounting assembly of FIG. 1.
Figure 2B:
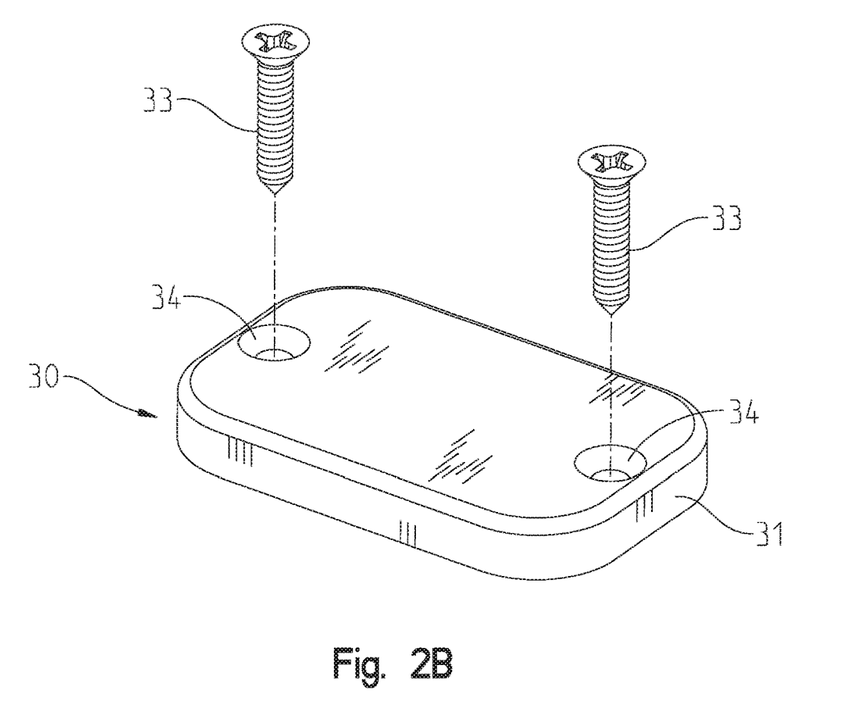
FIG. 2B is an exploded perspective view of another illustrative mounting base of FIG. 2A.
Figure 3A:
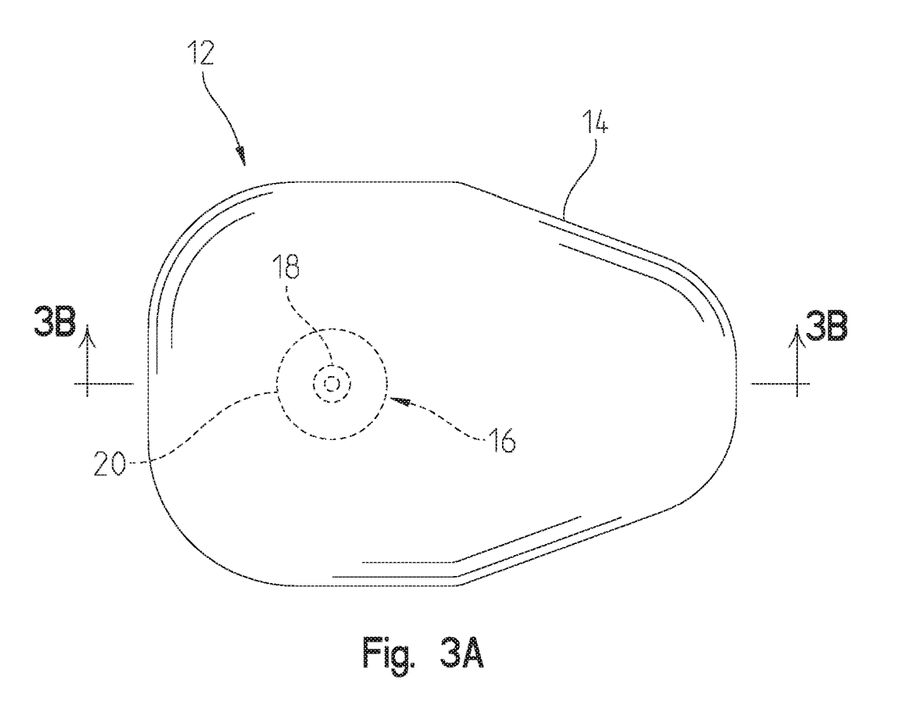
FIG. 3A is a side elevational view of a radio handset microphone coupled to the mounting assembly of FIG. 1.
Figure 3B:
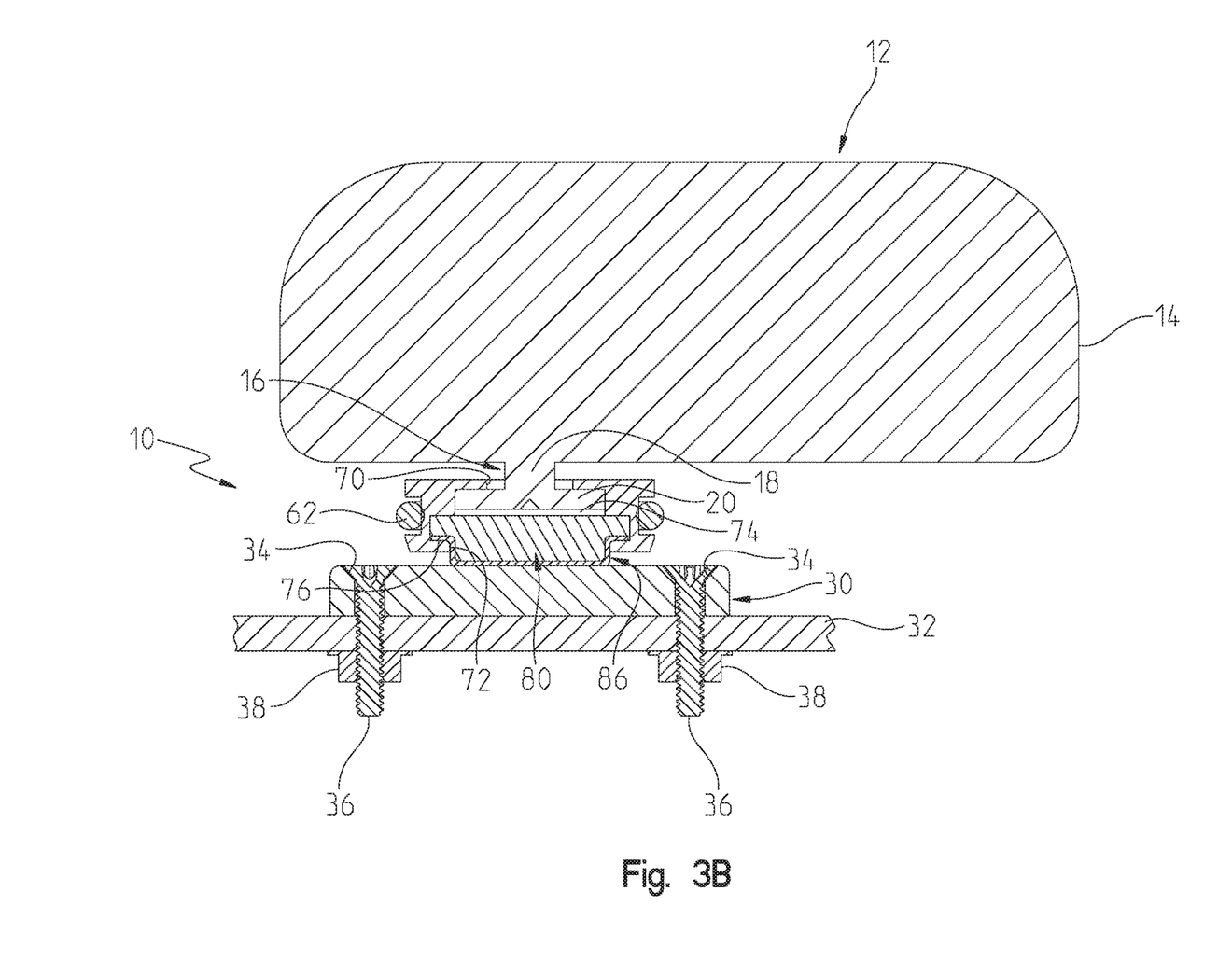
FIG. 3B is a cross-sectional view taken along line 3B-3B of FIG. 3A, showing the mounting assembly of FIG. 1 cooperating with a radio handset microphone.
Figure 4A:
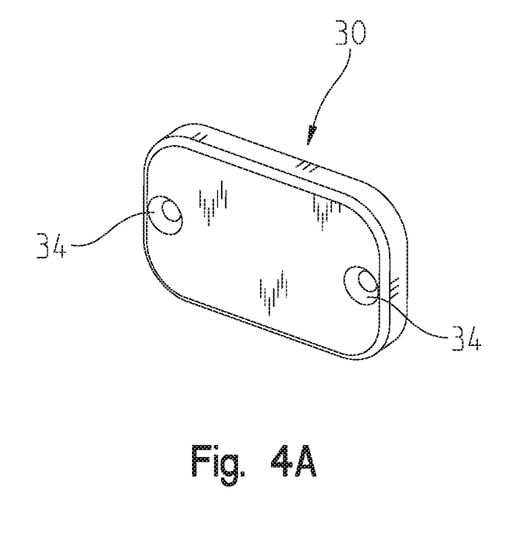
FIG. 4A is a perspective view of an illustrative base of the mounting assembly of FIG. 1.
Figures 4B, 4C:
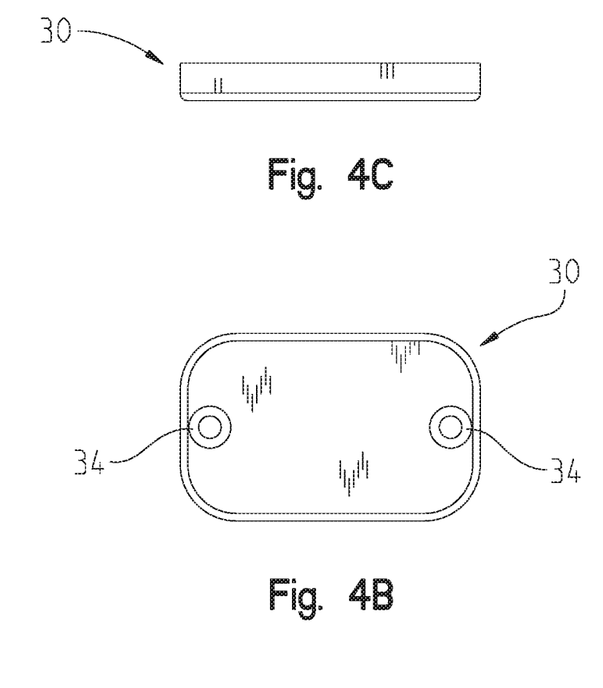
FIG. 4B is a top plan view of the illustrative base of FIG. 4A.
FIG. 4C is a first side elevational view of the illustrative base of FIG. 4A.
Figure 4D:
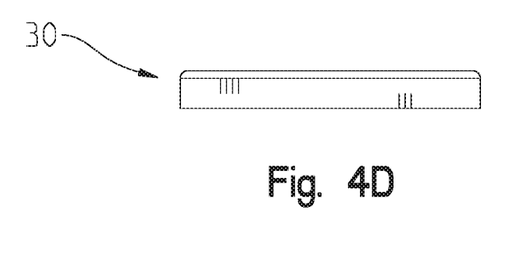
FIG. 4D is a second side elevational view of the illustrative base of FIG. 4A.
Figure 4E:
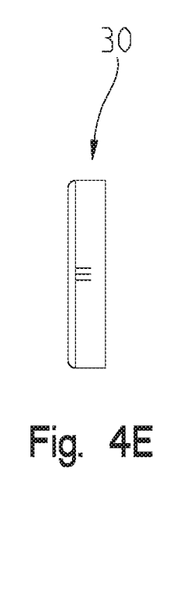
FIG. 4E is an end view of the illustrative base of FIG. 4A.
Figures 5A, 5B, 5C, 5D, 5E:
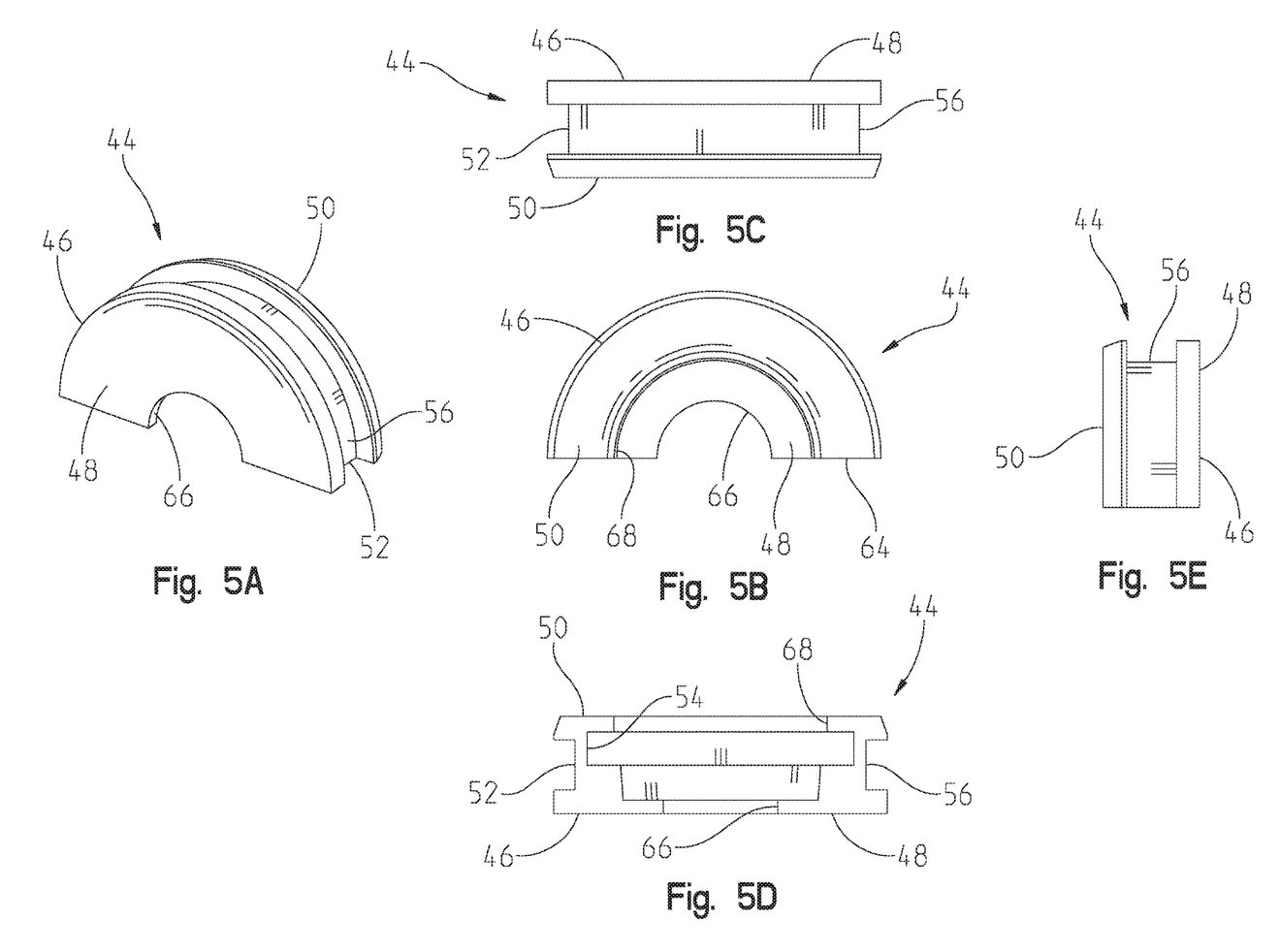
FIG. 5A is a perspective view of an illustrative first housing member of the mounting assembly of FIG. 1.
FIG. 5B is a bottom plan view of the illustrative first housing member of FIG. 5A.
FIG. 5C is a first side elevational view of the illustrative housing of FIG. 5A.
FIG. 5D is a second side elevational view of the illustrative first housing member of FIG. 5A.
FIG. 5E is an end view of the illustrative first housing member of FIG. 5A.
Figures 6A, 6B, 6C, 6D:
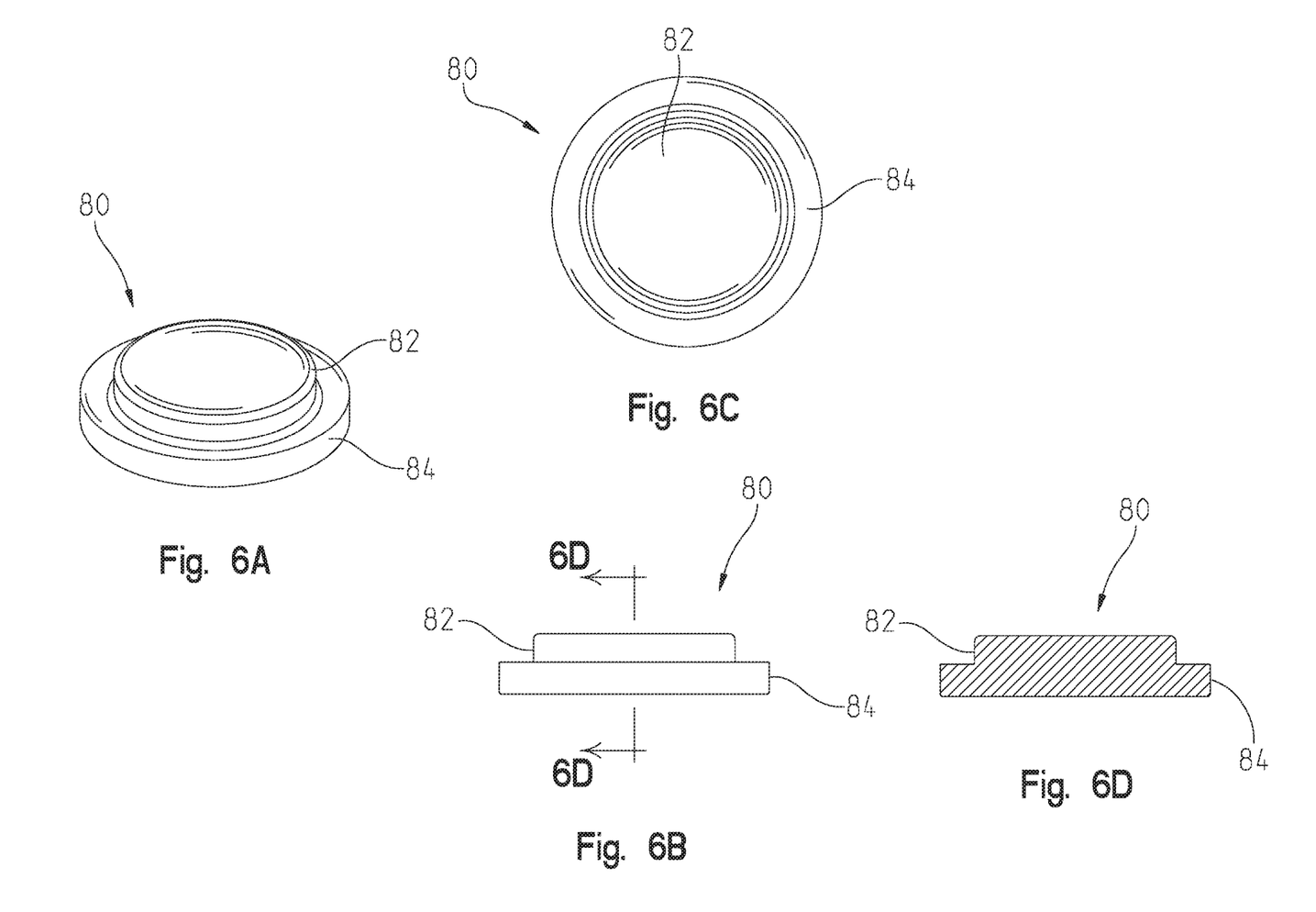
FIG. 6A is a perspective view of an illustrative magnet of the mounting assembly of FIG. 1.
FIG. 6B is a side elevational view of the illustrative magnet of FIG. 6A.
FIG. 6C is a bottom plan view of the illustrative magnet of FIG. 6A.
FIG. 6D is a cross-sectional view of the illustrative magnet of FIG. 6A.
Figure 7A:
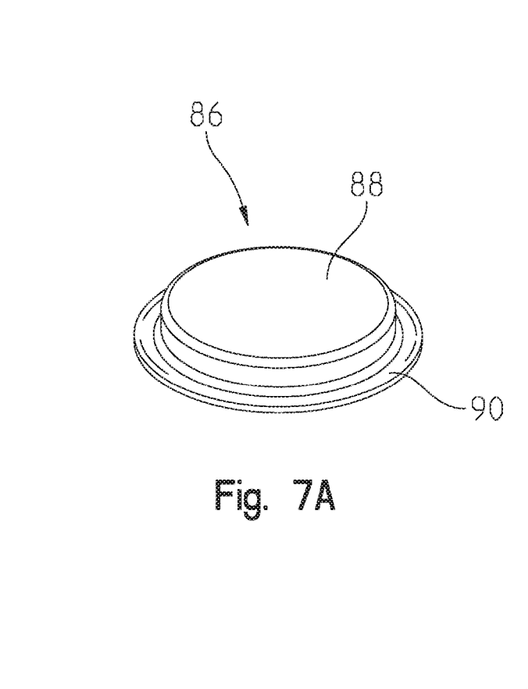
FIG. 7A is a perspective view of an illustrative shield of the mounting assembly of FIG. 1.
Figure 7B:
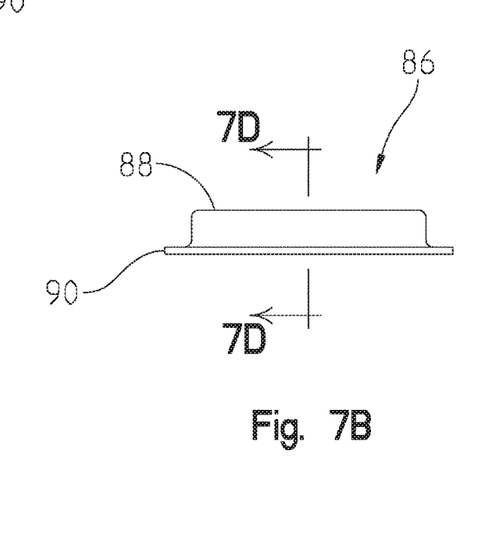
FIG. 7B is a side elevational view of the illustrative shield of FIG. 7A.
Figure 7C:
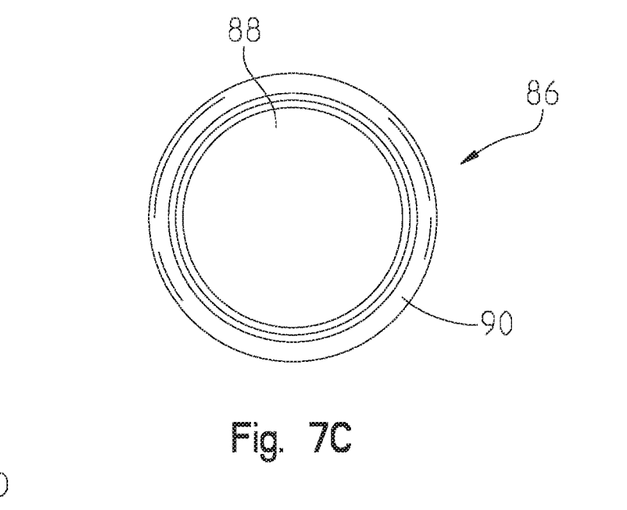
FIG. 7C is a bottom plan view of the illustrative shield of FIG. 7A.
Figure 7D:
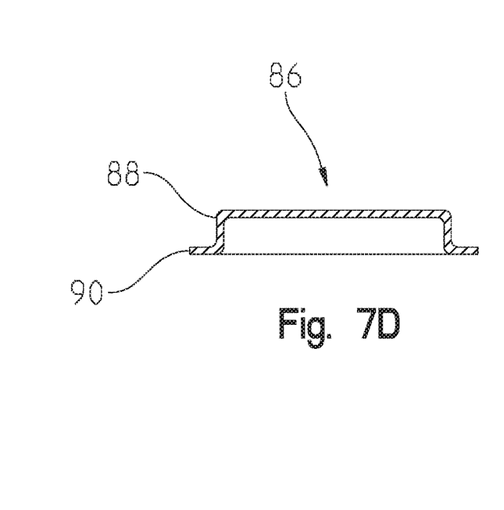
FIG. 7D is a cross-sectional view of the illustrative shield of FIG. 7C.

As shown in FIGS. 1-4E, the mounting assembly 10 illustratively includes a base 30 having a body 31 formed of the magnetically attractive material (such as a metal), and is configured to be supported by an interior surface 32 of a vehicle (FIG. 3B). More particularly, a fastener, such as mounting screws 33 (FIG. 2B) extending through openings 34 in the body 31 may be used to couple the base 30 to a support, illustratively to the interior surface 32 of the vehicle. Such a support may include, for example, a vehicle dashboard or a center console. As an alternative to the mounting screws 33, mounting bolts 36 and cooperating nuts 38 (FIGS. 2A and 3B) may be used to secure the base 30 to the interior surface 32 of the vehicle. While two mounting screws 33 or bolts 36 are illustrated, it should be appreciated that any number of such fasteners may be used. In yet other illustrative embodiments, different conventional fasteners, such as adhesives and/or tapes may be used to secure the base 30 to a support.

Illustratively, an adapter 40 is configured to couple with the mechanical hang-up clip 16. More particularly, the adapter 40 is secured to the mechanical hang-up clip 16, and releasably couples with the base 30. With reference to FIGS. 1-3B and 5A-5E, the adapter 40 illustratively includes a disc shaped body or housing 42 defined by a first housing member 44a cooperating with a second housing member 44b. Illustratively, the first housing member 44a and the second housing member 44b are substantially identical and illustratively may be molded from a polymer. More particularly, each illustrative housing member 44a, 44b includes a semi-circular body 46 having a proximal or upper wall 48, a distal or lower wall 50, and an arcuate side wall 52 extending longitudinally between the upper wall 48 and the lower wall 50. An inner arcuate groove 54 and an outer arcuate groove 56 are formed within the body 46.

A coupler 60 secures together the first housing member 44a and the second housing member 44b. The coupler 60 illustratively comprises a resilient o-ring 62 received around the disc-shaped housing 42. More particularly, the o-ring 62 may be formed of an elastomer and is received within the outer arcuate grooves 56 of the housing members 44a, 44b. When coupled together along planar interface surfaces 64a and 64b, the housing members 44a and 44b define the disc shaped housing 42. As further detailed herein, the housing members 44a and 44b clamp around the hang-up clip 16 by a retaining force applied by the coupler 60.

The upper wall 48 illustratively includes an arcuate notch 66, and the lower wall 50 illustratively includes an arcuate notch 68. When the housing members 44a and 44b are coupled together to define the housing 42, the notches 66 define a proximal opening 70, and the notches 68 define a distal opening 72.

A proximal chamber 74 is defined by the first housing member 44a and the second housing member 44b. The proximal chamber 74 is configured to receive the tongue 20 of the mechanical hang-up clip 16. The proximal opening 70 is in communication with the proximal chamber 74. The proximal opening 70 is configured to receive the post 18 of the mechanical hang-up clip 16 (FIG. 3).

With reference to FIGS. 2, 3 and 6A-6D, a distal chamber 76 is defined by the first housing member 44a and the second housing member 44b, and is in fluid communication with a distal opening 72. A magnet 80 is received within the distal chamber 76. The magnet 80 illustratively includes a body 82 and a radially outwardly extending mounting rim or lip 84. The body 82 is illustratively received within the distal opening 72, and the mounting lip 84 is illustratively received within the distal chamber 76 (FIG. 3). More particularly, the body 82 extends downwardly from the mounting lip 84 and through the distal opening 72. The magnet 80 may be formed of a conventional material composition, such as ferrite or neodymium. As further detailed herein, the magnet 80 is configured to releasably couple with the base 30, or another magnetically attractive member, via a magnetic force.

With reference to FIGS. 2, 3 and 7A-7D, a shield or cover 86 is illustratively coupled to the magnet 80. More particularly, the shield 86 is illustratively formed of a metal and covers at least a portion of the external surface of the magnet 80. The shield 86 illustratively includes a cap 88 and a radially outwardly extending rim or lip 90. Illustratively, the shield 86 is positioned laterally between the magnet 80 and the side wall 52 of the housing members 44a, 44b, and is positioned longitudinally between the magnet 80 and the base 30. More particularly, the cap 88 extends downwardly from the lip 90 and through the distal opening 72. The shield 86 is configured to protect the magnet 80 from the environment, such as moisture and/or debris. In other illustrative embodiments, the shield 86 may be eliminated. In such illustrative embodiments, the magnet 80 may be protected by a coating or covering, for example, a polymeric coating.

The illustrative mounting assembly 10 coverts the conventional hang-up clip 16 from a mechanical connection with a support, to a magnetic connection with a support. More particularly, the magnet 80 of the mounting assembly 10 is magnetically attracted to a magnetically attractive member, such as the base 30, thereby releasably coupling the radio handset microphone 12 to an interior surface of the vehicle without requiring the user to align the hang-up clip 16 with a conventional mounting slot and groove. The magnetic connection facilitates simple coupling and uncoupling of the microphone 12 with the base 30 or another magnetically attractive member.

Although the invention has been described in detail with reference to certain preferred embodiments, variations and modifications exist within the spirit and scope of the invention as described and defined in the following claims.

The invention claimed is:

1. A mounting assembly for a radio handset microphone, the mounting assembly comprising:
   a base formed of magnetically attractive material;
   a fastener configured to secure the base to an interior surface of a vehicle; and
   an adapter configured to couple to a mechanical hang-up clip having a post and a tongue supported by the post, the adapter including:
      a first housing member,
      a second housing member cooperating with the first housing member,
      a coupler securing together the first housing member and the second housing member, a proximal chamber defined by the first housing member and the second housing member, the proximal chamber configured to receive the tongue of the mechanical hang-up clip, a proximal opening defined by the first housing member and the second housing member, the proximal opening in communication with the proximal chamber and configured to receive the post of the mechanical hang-up clip, a distal chamber defined by the first housing member and the second housing member, and a magnet received within the distal chamber.

2. The mounting assembly of claim 1, further comprising a distal opening defined by the first housing member and the second housing member, the distal opening in communication with the distal chamber.

3. The mounting assembly of claim 2, further comprising a shield positioned distal of the magnet and supported by the first housing member and the second housing member, the shield extending through the distal opening.

4. The mounting assembly of claim 1, wherein the fastener comprises at least one mounting screw or at least one mounting bolt.

5. The mounting assembly of claim 1, wherein the first housing member is semi-circular, and the second housing member is semi-circular, such that the first housing member and the second housing member together define a disc shaped housing.

6. The mounting assembly of claim 5, wherein the coupler comprises a resilient o-ring received around the disc shaped housing.

7. The mounting assembly of claim 6, wherein an annular groove is defined around the outer periphery of the disc shaped housing, the o-ring received within the annular groove.

8. The mounting assembly of claim 1, wherein the proximal chamber is defined between the magnet and an upper wall defined by the first housing member and the second housing member, the proximal opening formed within the upper wall.

9. The mounting assembly of claim 1, wherein the magnet includes a mounting lip received within the distal chamber, and a body received within the distal opening.

10. An adapter configured to couple to a mechanical hang-up clip having a post and a tongue supported by the post, the adapter comprising:

a disc shaped housing defined by a first housing member and a second housing member cooperating with the first housing member;

a coupler securing together the first housing member and the second housing member;

a proximal chamber defined by the disc shaped housing, the proximal chamber configured to receive the tongue of the mechanical hang-up clip;

a proximal opening in communication with the proximal chamber, the proximal opening configured to receive the post of the mechanical hang-up clip;

a distal chamber defined by the disc shaped housing;

a magnet received within the distal chamber; and wherein the proximal chamber is defined between the magnet and an upper wall defined by the disc shaped housing, the proximal opening formed within the upper wall.

11. The adapter of claim 10, further comprising a distal opening defined by the first housing member and the second housing member, the distal opening in communication with the distal chamber.

12. The adapter of claim 11, further comprising a shield positioned distal of the magnet and supported by the first housing member and the second housing member, the shield extending through the distal opening.

13. The adapter of claim 10, wherein the coupler comprises a resilient o-ring received around the disc shaped housing.

14. The adapter of claim 13, wherein an annular groove is defined around the outer periphery of the disc shaped housing, the o-ring received within the annular groove.

15. The adapter of claim 10, wherein the magnet includes a mounting lip received within the distal chamber, and a body received within the distal opening.

16. The adapter of claim 10, wherein the first housing member is semi-circular, and the second housing member is semi-circular.

* * * * *